United States Patent
Akiyama

Patent Number: 5,127,018
Date of Patent: Jun. 30, 1992

[54] HELIUM-NEON LASER TUBE WITH MULTILAYER DIELECTRIC COATING MIRRORS

[75] Inventor: Yasuhiro Akiyama, Tokyo, Japan
[73] Assignee: NEC Corporation, Tokyo, Japan
[21] Appl. No.: 562,599
[22] Filed: Aug. 3, 1990
[30] Foreign Application Priority Data
Aug. 8, 1989 [JP] Japan .................. 1-205939
[51] Int. Cl.$^5$ .............................. H01S 3/08
[52] U.S. Cl. ...................... 372/99; 372/108; 372/55; 359/580; 359/589
[58] Field of Search ........... 372/99, 107, 108, 55; 350/164, 165

[56] References Cited
U.S. PATENT DOCUMENTS

| | | | |
|---|---|---|---|
| 4,084,883 | 4/1978 | Eastman et al. | 372/99 |
| 4,099,840 | 7/1978 | van der Wal et al. | 372/99 |
| 4,132,959 | 1/1979 | Bouwhuis et al. | 372/99 |
| 4,147,409 | 4/1979 | Apfel | 372/99 |
| 4,615,033 | 9/1986 | Nakano et al. | 372/99 |
| 4,615,034 | 9/1986 | von Gunten et al. | 372/99 |
| 4,800,568 | 1/1989 | Krueger et al. | 372/99 |
| 4,856,019 | 8/1989 | Miyata et al. | 372/57 |

Primary Examiner—Léon Scott, Jr.
Attorney, Agent, or Firm—Helfgott & Karas

[57] ABSTRACT

The structure of the output mirror of a He-Ne laser tube is represented as "Sub. $|H \cdot n_1 L \cdot (H \cdot L)_4 \cdot H \cdot n_2 L|$ Air" wherein Sub. is a transparent substrate; H and L are layers of high refractive index material and low refractive index material, respectively, stacked alternately to form multilayer dielectric coatings; $(H \cdot L)_4$ stands for a series of four layer pairs each consisting of high refractive index material layer and low reflective index material layer stacked alternately H and L; Air stands for an atmosphere to which the top surface of the multilayer coating is exposed; each of H and L has a thickness of $\lambda_0/4$; $\lambda_0$ is 6328 Å; $n_1$ is a natural number selected from the group consisting of 3, 5 and 7; and $n_2$ is a natural number determined by $n_2 = 9 - n_1$. Likewise a preferred multilayer structure of the total reflection mirror is represented as "Sub. $|(H \cdot L)_{11} \cdot H \cdot 7L|$ Air". Use of these mirrors effects increase in reflectivity at $\lambda_0 = 6328$ Å and reduction in reflectivity at $\lambda = 3.39$ μm to not more than 1%. Thus it can be achieved to increase power output at $\lambda_0 = 6328$ Å.

3 Claims, 5 Drawing Sheets

HELIUM-NEON LASER TUBE WITH MULTILAYER DIELECTRIC COATING MIRRORS

BACKGROUND OF THE INVENTION

This invention relates to laser mirrors for a helium-neon (He-Ne) laser tube, and particularly to structures of laser mirrors each having a multilayer dielectric coating structure with an effect to increase laser output at wavelength $\lambda_0 = 6328$ Å and reduce laser output at wavelength $\lambda = 3.39$ μm.

A He-Ne laser tube produces laser oscillation at $\lambda_0 = 6328$ Å on the corresponding transition from level $3S_2$ to level $2P_4$, and also at $\lambda = 3.39$ μm on the corresponding transition from level $3S_2$ (common level with the above-mentioned) to level $3P_4$. Owing to the by far greater amplification gain of the oscillation at $\lambda = 3.39$ μm than that at $\lambda_0 = 6328$ Å, often both oscillations take place simultaneously in the same laser tube. In other words, the so-called competitive phenomenon is found. In this case, therefore, the output becomes decreased compared with a single oscillation at $\lambda_0 = 6328$ Å alone. This phenomenon is not so remarkable at small power outputs of 1 mW order but becomes marked particularly for high power output He-Ne laser apparatus of 5 mW or more.

As a proposal for solving this difficulty, is disclosed in Japanese Patent Publication No. 63-26560 an example of He-Ne laser mirror designed to have such a spectral reflectivity that reflectivity at $\lambda_0 = 6328$ Å is great and reflectivity at $\lambda = 3.39$ μm is small. This Japanese Patent publication additionally teaches that the multilayer dielectric coating structure of the output mirror should be composed of a minimized number of layers, and that for allowing a part of laser beam at $\lambda_0 = 6328$ Å oscillating in the He-Ne laser tube to escape from there, the output mirror is required to be generally about 1.1% to 1.9% in transmittance at $\lambda_0 = 6328$ Å, and correspondingly about 98.1% to 98.9% in reflectivity. The multilayer coating on a transparent substrate of glass is composed of high refractive index layers (H) of titanium dioxide and low refractive index layers (L) of silicon dioxide, stacked alternately H and L. Of the coating layers, only the top has an optical thickness of $\lambda_0/2 (\lambda_0 = 6328$ Å), and each of the other layers has a thickness of $\lambda_0/4$. Thus the structure of the output mirror is represented as "Sub. |H·L)$_x$—H·2L| Air". The term "Sub." means a substrate. According to this Japanese Patent Application, no structure can meet the condition for use as the output mirror where transmittance at the $\lambda_0 = 6428$ Å is within a range of 1.1 to 1.9%, except $x = 5$ in the formula, that is, 12 layers. This structure, however, gives a great reflectivity at 3.39 μm as much as 7.5%. For overcoming this drawback, has been proposed another 12-layer structure represented as "Sub. |(H·L)$_5$—Z·2L| Air", wherein Z is a dielectric layer of zirconium oxide or lanthanum oxide, of which the optical layer thickness is $\lambda_0/4$ and the index of refraction is between H and L.

On the other hand, it has been proposed for the total reflection mirror to have a 20-layer coating, i.e. structure expressed as "Sub. |(H·L)$_9$—H·2L| Air" or 22-layer coating, i.e. structure expressed as "Sub. |(H·L)$_{10}$—H·2L| Air".

The above-mentioned structures of the output mirror and the total reflection mirror give each a reflectivity of 3% at $\lambda = 3.39$ μm. This value is not entirely regarded as being suppressed to be enough small, and particularly for a high-power output He-Ne laser tube, it is not be allowed to neglect simultaneous laser oscillation at $\lambda = 3.39$ μm.

Besides, the structure of the above-mentioned output mirror requires the use of three kinds of dielectric material different in refractive index and in conditions of vacuum deposition, and hence presents disadvantages: for example, much time it takes for respective vacuum evaporations and for switching work before each, associated mistakes which may occur, and correspondingly lower yield of production.

SUMMARY OF THE INVENTION

It is a major object of the present invention to provide laser mirrors having an easy-to-fabricate structure having effect to reduce the reflectivity at $\lambda = 3.39$ μm of it by not more than 1%.

According to the present invention, a He-Ne laser tube has improved laser mirrors each having a new multi-layer coating structure meeting the requirement that the reflectivity is high at $\lambda_0 = 6328$ Å and is as low as up to 1% at $\lambda = 3.39$ μm. The laser mirrors have an output mirror having a multilayer coating composed of 12 layers of alternately high refractive index material "H" and low refractive index material "L" on each other. The second and top layers in respect to the substrate have optical layer thicknesses of $(\lambda_0/4) \times n_1$ and $(\lambda_0/4) \times n_2$, respectively, ($\lambda_0 = 6328$Å; and $n_1 = 3$, $n_2 = 6$; $n_1 = 5, n_2 = 4$; or $n_1 = 7$, $n_2 = 2$). Each of the other layers has an optical layer thickness of $\lambda_0/4$ ($\lambda_0 = 6328$Å). Thus the structure of the output mirror is represented by "Sub. |H·3L (H·L)$_4$—H·6L| Air; Sub.|H·5L (H·L)$_4$—H·4L| Air; or Sub. |H·7L (H·L)$_4$—H·2L| Air". The term "Sub." means a transparent substrate. On the other hand, the multilayer coating of the total reflection mirror is composed of 24 layers of alternately high refractive index material "H" and low refractive index material "L" on each other. The top layer in respect to the substrate has an optical layer thickness of $(\lambda_0/4) \times 7$, and each of the other layers has an optical layer thickness of $\lambda_0/4$ ($\lambda_0 = 6328$Å). Thus, the structure of the total reflection mirror is represented by "Sub. |(H·L)$_{11}$—H·7L| Air".

DESCRIPTION OF THE PREFERRED EMBODIMENT

Figure 1:
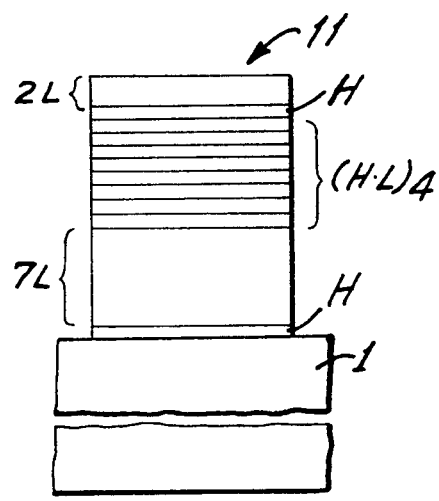
FIG. 1 is a sectional view illustrating the structure of an output mirror used in a He-Ne laser tube according to a preferred embodiment of the present invention.

Referring to FIG. 1, an output mirror used in a He-Ne laser tube according to the preferred embodiment of the present invention is composed of an optically-polished glass substrate 1 and a 12-layer coating 11 thereon. The 12-layer coating 11 has a multilayer structure of high refractive index layers (H) of titanium dioxide and low refractive index layers (L) of silicon dioxide which are alternately covered. Each layer (H, L) has a thickness of $\lambda_0/4$, i.e. 1582 Å for the oscillation at 6328 Å. Various changes in thicknesses of the intermediate layers of the multilayer coating 11 result in reflectivities at $\lambda_0 = 6328$ Å exceeding 99.0%, and thus failed to produce any output mirror suitable for actual use. It, however, was found that change in thicknesses of the top and second (in respect to the substrate) layers of low refractive index material affecting slightly on the reflectivity at $\lambda_0 = 6328$ Å could effect reduction of the reflectivity at $\lambda = 3.39$ μm to not more than 1%. This can be set as follows: when the structure is represented by "Sub. |H·n$_1$L·(H·L)$_4$·H·n$_2$L|Air", wherein n$_1$ is any selected from the group consisting of 3, 5 and 7 under the condition of $n_1 + n_2 = 9$.

Figure 2:
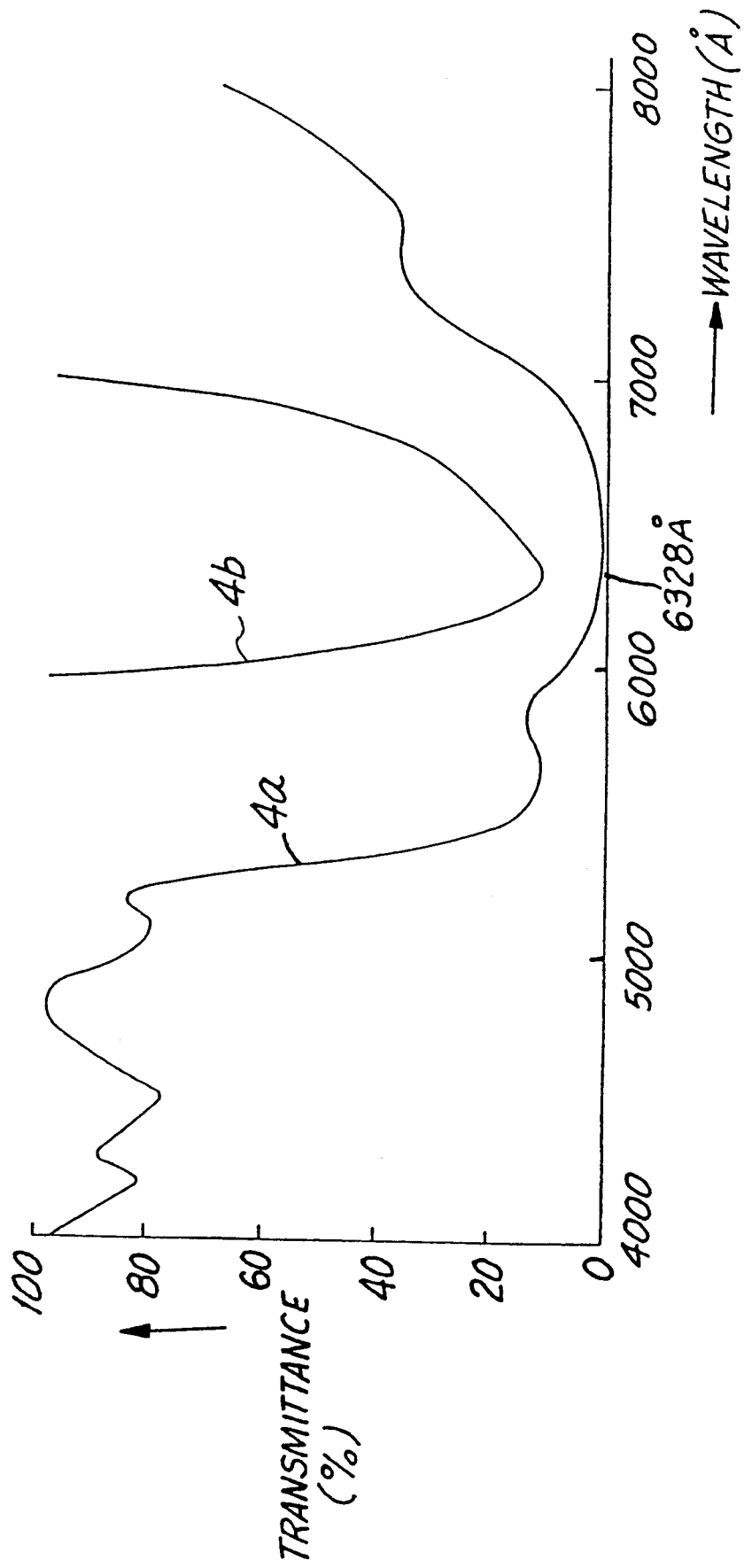
FIG. 2 shows, of the output mirror according to the preferred example of the present invention, the spectral transmittance (represented by two different-scale curves) over a wavelength range of from 4000 to 8000 Å.
Figure 3:
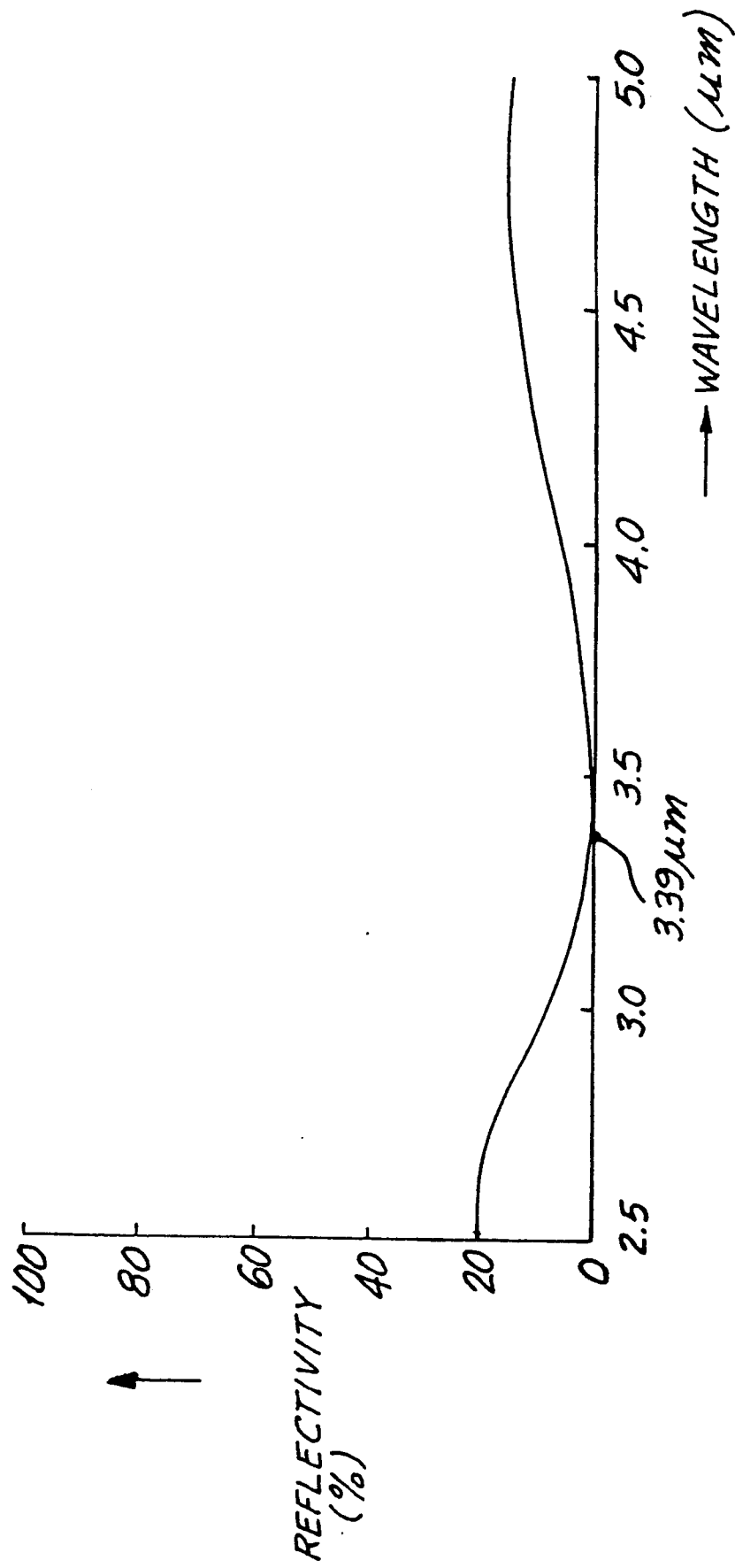
FIG. 3 shows, of the output mirror according to the present invention, the spectral reflectivity over a wavelength range of from 2.5 to 35 μm.

FIG. 1 shows an example of structure represented by "Sub. |H·7L·(H·L)$_4$·H·2L|Air" (a case of $n_1 = 7$ and $n_2 = 2$). This structure gives a transmittance of 1.3% (corresponding reflectivity of 98.7%) at 6328 Å and a reflectivity at $\lambda = 3.39$ μm is as small as 0.3%. FIG. 2 gives the measured spectral transmittance over a wavelength range of from 4000 to 8000Å displayed with curves 4a and 4b taking 100% and 10%, respectively, as the full ordinate scale, adn the measured transmittance at 6328Å can be seen to be 1.3%. FIG. 3 gives the measured spectral reflectivity over a wavelength range of from 2.5 to 5 μm and shows the reflectivity at $\lambda = 3.39$ μm to be 0.3% which is near a minimum value of the spectral reflectivity.

When $n_1 = 5$ and $n_2 = 4$, the transmittance at $\lambda_0 = 6328$Å is 1.3% (reflectivity: 98.7%) and the reflectivity at $\lambda = 3.39$ μm is 0.3%. Besides, when $n_1 = 3$ and $n_4 = 6$, the transmittance at $\lambda = 6328$ Å is 1.3% (reflectivity: 98.7%) and the reflectivity at $\lambda = 3.39$ μm is 0.6%.

In any case except the above-mentioned, the conditions for the output mirror are not met. For example, when $n_1 = 6$ and $n_2 = 2$, the reflectivity at $\lambda = 6328$ Å is 95.3%. The reflectivity at $\lambda = 3.39$ μm is as great as 10%. When $n_1 = 7$ and $n_2 = 3$, the reflectivity at $\lambda = 3.39$ μm is 1% and the reflectivity at $\lambda = 6328$Å is 97.4%, these being not meet the conditions for the output mirror. When $n_1 = 7$ and $n_2 = 1$, the reflectivity at $\lambda = 3.39$ μm is 1.3% and the reflectivity at $\lambda = 6328$Å is 97.4%, these being out of the desired range which the present invention aims at.

As described above, only under the conditions set in the embodiment of the present invention, it is possible for the reflectivity at $\lambda = 3.39$ μm to be suppressed to not more than 1% and for the reflectivity at $\lambda_0 = 6328$Å to be brought within the range required for the output mirror.

When the total number of layers is not more than 10, the reflectivity at $\lambda_0 = 6328$Å becomes up to 97%, not allowing to be used.

Figure 4:
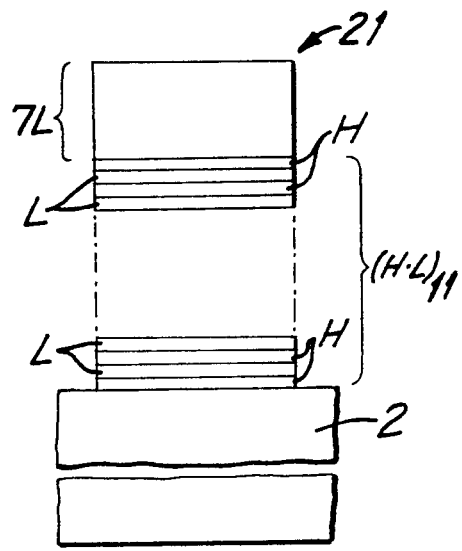
FIG. 4 is a sectional view illustrating the structure of a total reflection mirror used in the He-Ne laser tube according to the preferred embodiment of the present invention.

FIG. 4 shows a total reflection mirror with a 24-layer coating 21 on an optically-polished glass substrate 2 used in the preferred embodiment of the present invention together with the output mirror of FIG. 1. The 24-layer coating 21 is similarly composed of high refractive index layers (H) of titanium dioxide and low refractive index layers (L) of silicon dioxide. Each of these high and low refractive index layers H and L has a thickness of $\lambda_0/4$, i.e. 1582Å for the oscillation at 6328Å.

The total reflection mirror is desired to have as great reflectivity at $\lambda_0 = 6328$Å as possible. In general, if it has a reflectivity of at least 99.9%, it can be used without any practical problem. In the above-mentioned formula: "Sub. |(H·L)$_x$H·2L|Air", values of x meeting a requirement for use as the total reflection mirror that the reflectivity at $\lambda_0 = 6328$Å is 99.9% or more are nine and ten, that is, the number of layers is 20 and 22. In these cases however the reflectivities at $\lambda = 3.39$ μm result in as great as 3%. For the purpose of eliminating this drawback, the present embodiment has provided a 24-layer coating with the top layer thickened to $7\lambda_0/4$, as represented by "Sub. |(H·L)$_{11}$H·7L|Air". This structure can give reflectivities at $\lambda_0 = 6328$Å and $\lambda = 3.39$ μm of 99.9% or more and no more than 0.1%, respectively.

Figure 5:
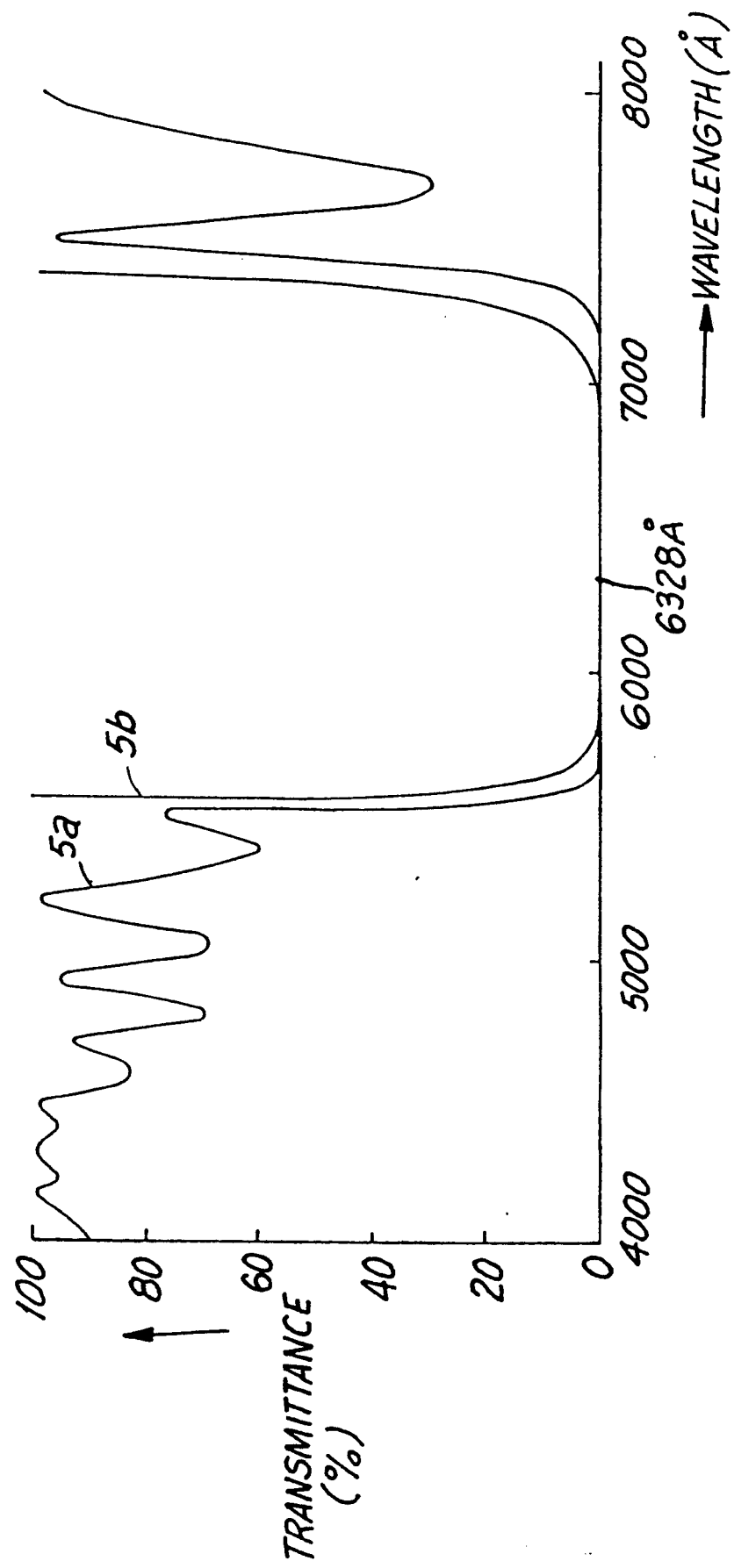
FIG. 5 shows, of the total reflection mirror according to the present invention, the spectral transmittance (represented by two different-scale curves) over a wavelength range of from 4000 and 8000 Å.
Figure 6:
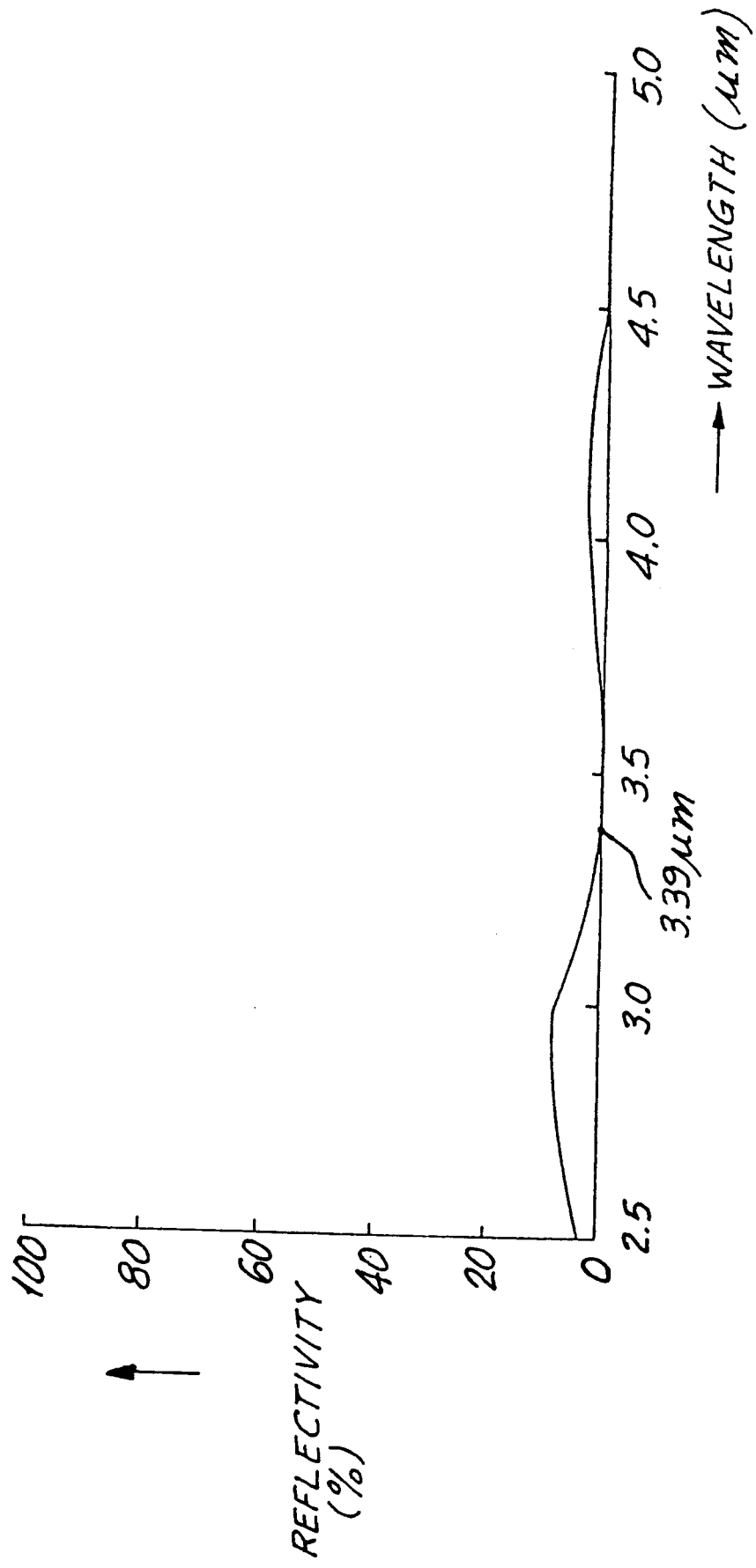
FIG. 6 shows, of the total reflection mirror according to the present invention, the spectral reflectivity over a wavelength range of from 2.5 and 35 μm.

The measured spectral transmittance of this structure over a wavelength range of 4000 to 8000Å are displayed in FIG. 5 with curves 5a and 5b taking 100% and 10%, respectively, as the ordinate full scale. They demonstrate that the transmittance at $\lambda_0 = 6328$Å is substantially zero, and correspondingly the reflectivity at $\lambda_0 = 6328$Å is substantially 100%. With the same total reflection mirror, for example, FIG. 6 displays the spectral reflectivity over a wavelength range of 2.5 to 5 μm, in which the reflectivity at $\lambda = 3.39$ μm can be seen to be substantially 0% approximate to a minimum value of the spectral reflectivity curve.

Besides, it has been revealed that the above-mentioned structure gives reflectivities at $\lambda = 3.39$ μm of more than 3% independent of whether the thickness of the top layer is more or less than $7\lambda_0/4$.

In the embodiment described above, the multilayers dielectric coating is made of titanium dioxide layers as the high refractive index layers (H) and silicon dioxide layers as the low refractive index layers (L). Instead known materials, for example combinations of cerium dioxide ($CeO_2$)/magnesium fluoride ($MgF_2$) and zinc sulfide (ZnS)/magnesium fluoride ($MgF_2$) could be used with similar results.

Figure 7:
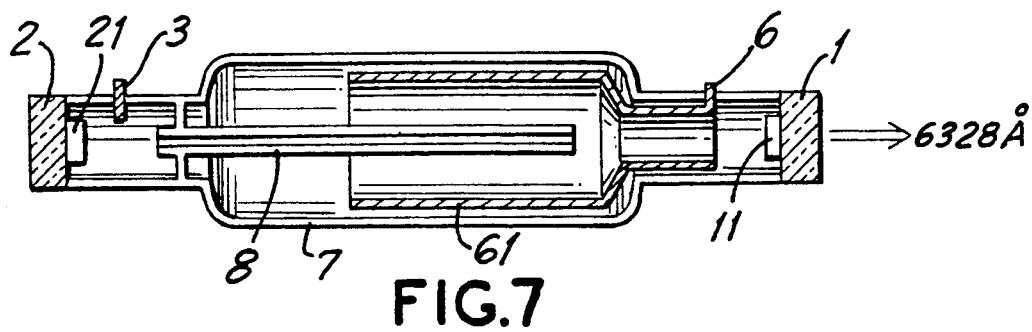
FIG. 7 is a sectional view of a He-Ne laser tube fitted with those mirrors according to the preferred embodiment of the present invention.

With the output mirror and the total reflection mirror quoted above was fabricated for a high power output (5 mW order) a He-Ne laser tube as shown in FIG. 7, which is affected only to a negligible extent by wavelength of 3.39 μm. Structure of He-Ne laser tube other than multi-layer mirror coating is well known as shown in FIG. 7. A glass envelope 7 is provided with a glass capillary tube 8 and anode 3 and cathode 6 connected to cylindrical cathode 61. A mixed gas of helium and Neon is sealed within the envelope 7.

In this high output power He-Ne tube, as described above, the output mirror comprises a multilayer coating made of only two different vacuum deposits, which effects reduction of the reflectivity at $\lambda = 3.39$ μm to less than 1%, resulting in preventing the laser tube from oscillating at $\lambda = 3.39$ μm and in turn in increasing the output at $\lambda_0 = 6328$Å. Additionally the features are mentioned that the multilayer structure consists of no more than 12 layers and that only some of the layers have thicknesses of integer times as many as $\lambda_0/4$ and every layer except them has an identical thickness of $\lambda_0/4$. These features can contribute to reducing fabrication time and to improving yield of production.

In the above-described embodiment of the present invention, the total reflection mirror and the output mirror have each a multilayer coating effecting suppression of reflectivity at $\lambda = 3.39$ μm. Also when only one of the mirrors is so, considerable effect can be produced.

It is a matter of course that the present invention can be applied not only to the above-mentioned high power output He-Ne laser tube but also to other He-Ne laser tubes.

What is claimed is:

1. A helium-neon laser tube comprising: a pair of laser mirrors each including a transparent substrate and a multilayer dielectric coating formed on aid substrate and composed of a number of layers of alternately high refractive index material and low refractive index material, one of said mirrors serving as an output laser mirrow, the multilayer dielectric coating of said output laser mirror being formed of 12 layers positioned one on another one an upper surface of said substrate and of which a second layer and an uppermost layer with respect to the upper surface of said substrate being formed of low refractive index material and thicknesses of the second and the uppermost layers being $n_1 \cdot \lambda_0/4$ and $n_2 \cdot \lambda_0/4$, respectively, wherein $\lambda_0 = 6328$Å, $n_1$ is a natural number selected from the group consisting or 3, 5 and 7, and $n_2 = 9 = n_1$ and a thickness of every layer except said second and uppermost layers is $\lambda_0/4$, whereby laser output of said tube is increased at a wavelength $\lambda_0 = 6328$Å, while reflectivity at wavelength $\lambda = 3.39$ μm is reduced to less than 1%.

2. A helium-neon laser tube as claimed in claim 1, wherein the multilayer dielectric coating of the other mirror of said pair serving as as total reflection laser mirror is formed of 24 layers, positioned one of another and of which an uppermost layer in respect to an upper surface of the substrate of the other mirror is made of low refractive index material and has a thickness of $7\lambda_0/4$, and a thickness of every layer except said uppermost layer being $\lambda_0/4$.

3. A helium-neon laser tube as claimed in claim 1, wherein said high refractive index material is titanium dioxide, and said low refractive index material is silicon dioxide.

* * * * *